(12) United States Patent
Friedl

(10) Patent No.: US 7,156,613 B2
(45) Date of Patent: Jan. 2, 2007

(54) ARRANGEMENT FOR BEARING RELIEF IN A GAS TURBINE

(75) Inventor: Winfried-Hagen Friedl, Berlin (DE)

(73) Assignee: Rolls-Royce Deutschland Ltd & Co KG, Blankenfelde-Mahlow (DE)

( * ) Notice: Subject to any disclaimer, the term of this patent is extended or adjusted under 35 U.S.C. 154(b) by 195 days.

(21) Appl. No.: 11/008,146

(22) Filed: Dec. 10, 2004

(65) Prior Publication Data

US 2005/0129507 A1 Jun. 16, 2005

(30) Foreign Application Priority Data

Dec. 11, 2003 (DE) ................................ 103 58 625

(51) Int. Cl.
*F01D 3/00* (2006.01)
(52) U.S. Cl. .................... 415/104; 415/231; 415/174.2; 415/115
(58) Field of Classification Search ................ 415/115, 415/230, 104, 231, 174.2, 174.5
See application file for complete search history.

(56) References Cited

U.S. PATENT DOCUMENTS

| 2,647,684 | A | * | 8/1953 | Lombard | ..................... 417/365 |
|---|---|---|---|---|---|
| 3,433,020 | A | | 3/1969 | Earle | |
| 4,697,981 | A | | 10/1987 | Brown | |
| 4,716,721 | A | * | 1/1988 | Pask et al. | ..................... 60/796 |
| 4,864,810 | A | | 9/1989 | Hines | |
| 5,735,666 | A | | 4/1998 | Johnston | |
| 5,862,666 | A | * | 1/1999 | Liu | ............................ 60/726 |
| 6,067,791 | A | | 5/2000 | Patel | |

FOREIGN PATENT DOCUMENTS

| DE | 1601554 A1 | 1/1971 |
|---|---|---|
| EP | 0184975 | 6/1986 |
| EP | 1219777 A2 | 7/2002 |

OTHER PUBLICATIONS

Patent Abstract of Japan 60162002; Aug. 1985; Narusue Shigetoshi.
Patent Abstract of Japan 62294701; Dec. 1987; Nakarani Yasuo.
German Search Report dated Jul. 27, 2004.

* cited by examiner

*Primary Examiner*—Ninh H. Nguyen
(74) *Attorney, Agent, or Firm*—Timothy J. Klima

(57) ABSTRACT

In a gas turbine, the compressor load is reduced and the turbine load is increased for controlled bearing load reduction by forming a low-pressure chamber (8) that is shielded from the compressor air at the compressor (1) and a high-pressure chamber (9) that is supplied with compressor air at the turbine along the high-pressure shaft (2). The pressures can be controlled within specific limits. Controlled bearing load reduction allows high speeds and a long service life of the bearings.

18 Claims, 1 Drawing Sheet

ARRANGEMENT FOR BEARING RELIEF IN A GAS TURBINE

This application claims priority to German Patent Application DE10358625.3 filed Dec. 11, 2003, the entirety of which is incorporated by reference herein.

BACKGROUND OF THE INVENTION

The invention relates to an arrangement for bearing relief in a gas turbine, especially for reducing the axial forces that act on the high-pressure bearing in an aircraft gas turbine comprising a blade cooling chamber formed between the compressor and the high-pressure turbine along the high-pressure shaft and supplied with compressor air.

It is known that the compressor in aircraft gas turbines generates a load in flight direction while the load originating from the turbine acts in opposite direction. The compressor load is typically greater than the turbine load on the high-pressure shaft of an aircraft gas turbine. The difference between the two opposite forces acts on the respective locating bearing (high-pressure bearing). The load on the locating bearing is the greater the more the forces emerging from the compressor and from the turbine deviate. As the design of gas turbines is improved to achieve higher ratings, process pressures, temperatures and speeds are increased which eventually increase the axial loads acting on the high-pressure bearing. The known solid metal bearings reach speed limits as a result of high centrifugal forces. The known hybrid bearings can be used at higher speeds but cannot absorb higher loads. The bearing problems resulting from increased load on bearings require shorter maintenance intervals or reduce the service life of the bearings. This sets tight limits for improving the power density of gas turbines.

In stationary turbines, the problem of bearing load compensation is known especially from high-performance turbines. The forward force of the fan is missing on the low-pressure shaft of stationary turbines derived from aircraft turbines. Such turbines are therefore equipped with additional devices that perform bearing load compensation. These devices can be located outside the gas turbine, which is not easily feasible with a high-pressure shaft.

The load acting on the low-pressure bearing in an industrial gas turbine known from U.S. Pat. No. 573,566 is reduced by constructional measures that can only be located outside the stationary gas turbine. An aircraft gas turbine is not suited for external constructional modifications.

U.S. Pat. No. 4,864,810 describes a steam piston balancing system for reducing the compressor forces that act on an axial bearing. To at least partially reduce the axial backward force that acts on the locating bearing, a pressure chamber supplied with vapor that comprises an inner surface that is connected with the bearing and rotates with it, is provided inside the gas turbine. An axial forward compressive force applied to the inner surface is transmitted to the locating bearing to provide relief. This type of bearing load reduction comes with the disadvantage that it requires the design of a pressure chamber and the provision of a high-pressure vapor source for controllable application of pressure to the inner surface of the pressure chamber that rotates with the locating bearing.

It is the problem of this invention to provide an internal arrangement in a gas turbine for reducing the differential force acting from the compressor and the turbine on a locating bearing that is of simple design and enables controlled bearing relief.

BRIEF SUMMARY OF THE INVENTION

This problem is solved according to the invention by the arrangement comprising the characteristics described herein. The description below discloses further characteristics and advantageous improvements of the invention.

The inventive idea starts from the concept that a compressor load is generated in flight direction (forward direction) and a turbine load is generated in opposite direction to the flight direction (backward direction) and involves applying reduced pressure of the compressor air to the rear side of the compressor of the high-pressure shaft and increased pressure of compressor air to the turbine or turbine disc to reduce the resulting load that acts on the locating bearing of the high-pressure shaft so that bearings can be used that enable high speeds and yet have a long service life.

Low or high pressure are set using a low-pressure chamber formed on the rear of the compressor in the area of the drive cone of the high-pressure shaft and shielded against the compressor air pressure or a high-pressure chamber located at the front of the turbine and supplied with compressed air from the compressor. The high and low-pressure chambers are sealed with gaskets against the high-pressure shaft.

The low pressure or high pressure in the respective chambers can in part be controlled by the sealing effect of the brush gaskets and the throttle effect of the opening cross sections of air outlet holes in the low-pressure chamber and in the low-pressure section behind the guide blades of the turbine or, for the high-pressure chamber, by the size of air inlet holes for the air supplied by the compressor. The load on the bearing can be controlled and set in conjunction with controlling and setting the respective pressure.

BRIEF DESCRIPTION OF THE DRAWINGS

An embodiment of the invention is described in greater detail and with reference to the single FIGURE showing a partial view of an aircraft gas turbine in the area of the high-pressure shaft between the compressor and the high-pressure turbine and the chamber for cooling the turbine blades that is located there.

DETAILED DESCRIPTION OF THE INVENTION

Figure 1:
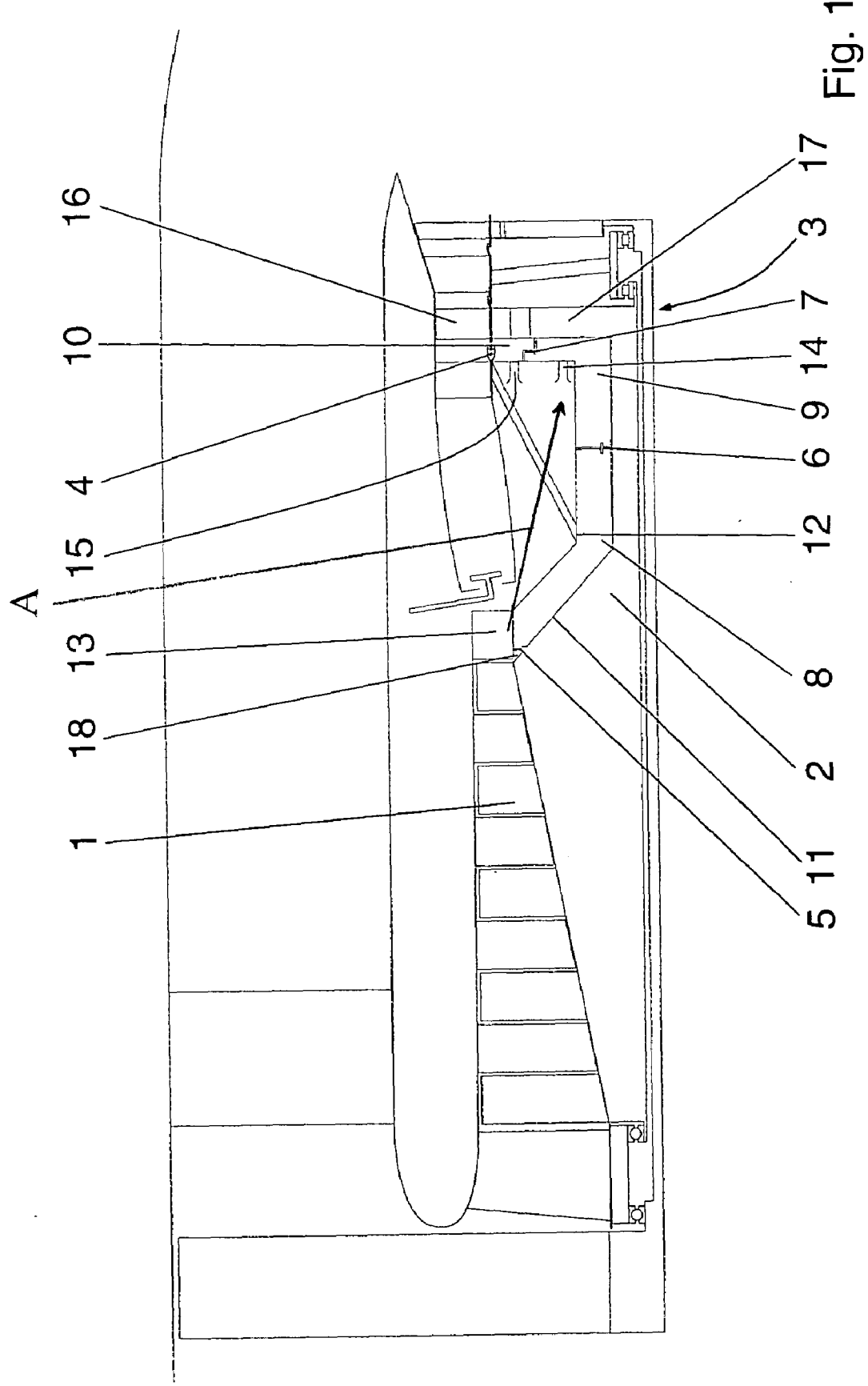

The embodiment described with reference to the FIGURE is based on the assumption that the forward axial force from the compressor acting on the locating bearing (not shown) of the high-pressure shaft 2 is typically greater than the backward axial force of the high-pressure turbine 3, and that the difference of these pressures determines the resulting force that acts on the locating bearing and the size of the bearing load. The load acting on the locating bearing of the high-pressure shaft can be considerably reduced by increasing the pressure that acts on the high-pressure shaft at the turbine and/or by reducing the pressure that acts on the high-pressure shaft at the compressor and the resulting reduced forces, allowing an increase in speed while ensuring a long service life of the bearing.

The chamber downstream of the compressor 1 that is defined by a labyrinth packing 4 at the high-pressure turbine 3 to provide the cooling air generated by the compressor 1 and required for cooling the turbine blades 16 is divided by the arrangement of a first brush-type seal 5 as well as second and third brush-type seals 6 and 7 into a low-pressure chamber 8 between the first and second brush-type seals 5 and 6, a high-pressure chamber 9 between the second and third brush-type seals 6 and 7, and the actual blade cooling chamber 10 between the third brush-type seal 7 and the labyrinth packing 4. The pressure in the low-pressure chamber 8 is determined by the sealing effect of brush-type seals 5 and 6 and by the size of the air outlet holes 12 in the low-pressure chamber 8 above the second brush-type seal 6 or the throttle surface in the low-pressure area behind the guide blades of the high-pressure turbine to which the low-pressure chamber 8 is connected. The full compressor output pressure only acts on the small space 18 in front of the first brush-type seal 5. The forward axial force from the compressor 1 and thus the difference between compressor load and turbine load that acts on the locating bearing is reduced by reducing the pressure generally across the entire length of the drive cone 11, i. e. by the formation of a low-pressure chamber 8 in this area, separated by brush-type seals 5 and 6.

Another reduction of the load acting on the locating bearing of the high-pressure shaft 2 is achieved by increasing the backward force from the high-pressure turbine in such a way that an increased pressure is generated between the second and third brush-type seals 6 and 7 in the high-pressure chamber 9 and applied to the turbine disc 17. For this purpose, a portion of the air compressed by the compressor 1 and discharged via a diffusor 13 is conducted along arrow A—past the low-pressure chamber 8 and separate from the air discharged therefrom—through air inlet holes 14 into the high-pressure chamber 9. This further increases the force that pushes the high-pressure turbine 3 backwards and the differential amount between the forward-acting compressor load and the backward-acting turbine load. The pressure that acts in the high-pressure chamber 9 is defined by the diameter of the air inlet holes 14.

The blade cooling chamber 10 formed between the third brush-type seal 7 and the labyrinth packing 4 is supplied with compressor air along arrow B through an opening 15 to cool the turbine blades 16 from there.

The compressor load can be decreased, and the turbine load increased, in a defined way, thereby optimally reducing the resulting load on the locating bearing of the high-pressure shaft, by the controlled setting of a specific low or high pressure in the low or high-pressure chambers 8, 9, respectively. The pressure in the low- and high-pressure chambers is set, on the one hand, by the sealing effect of the brush-type seals 5 to 7 and, on the other hand, by the size of the air outlet holes 12 in the low-pressure chamber 8 and the size of a throttle surface on the air discharge side in the low-pressure area behind the guide blades of the turbine as well as the size of the air inlet holes 14 in the high-pressure chamber 9.

LIST OF REFERENCE SYMBOLS

1 Compressor
2 High-pressure shaft
3 High-pressure turbine
4 Labyrinth packing
5 First brush-type seal
6 Second brush-type seal
7 Third brush-type seal
8 Low-pressure chamber
9 High-pressure chamber
10 Blade cooling chamber
11 Drive cone
12 Air outlet holes in 8
13 Main gas duct/diffuser
14 Air inlet holes in 9
15 Opening in the blade cooling chamber
16 Turbine blade
17 Turbine disc
18 Space in front of the first brush-type seal

The invention claimed is:

1. An arrangement for reducing forces acting on a high-pressure bearing in an aircraft gas turbine, comprising:
   a blade cooling chamber formed between a compressor and high-pressure turbine that is supplied with compressor air,
   a low-pressure chamber for compressor load reduction is located at a rear of the compressor upstream of a blade cooling chamber,
   a high-pressure chamber for turbine load increase located at a front of the high-pressure turbine,
   seals separating both chambers from a high-pressure shaft, the low-pressure chamber being connected to a low-pressure area behind guide blades of the high-pressure turbine via air outlet holes, the high-pressure chamber comprising air inlet holes supplied with compressor air.

2. The arrangement according to claim 1, wherein the seals that define the low- and high-pressure chambers are brush-type seals.

3. The arrangement according to claim 1, wherein at least one of a size of the air outlet hole and an air outlet cross section in the low-pressure area behind the guide blades is variable for setting a pressure in the low-pressure chamber and a load on the compressor.

4. The arrangement according to claim 3, wherein a size of the air inlet holes is variable for setting a pressure in the high-pressure chamber and for setting a load on the high-pressure turbine.

5. The arrangement according to claim 4, wherein the low-pressure chamber is generally located in a vicinity of a drive cone of the high-pressure shaft.

6. The arrangement according to claim 5, wherein the high-pressure chamber is generally located in a vicinity of a turbine disc.

7. The arrangement according to claim 6, wherein the low-pressure chamber is connected to a bypass flow duct of a fan engine.

8. The arrangement according to claim 7, wherein the low-pressure chamber is connected to a chamber between a high- and a low-pressure shaft.

9. The arrangement according to claim 4, wherein the high-pressure chamber is generally located in a vicinity of a turbine disc.

10. The arrangement according to claim 4, wherein the low-pressure chamber is connected to a bypass flow duct of a fan engine.

11. The arrangement according to claim 4, wherein the low-pressure chamber is connected to a chamber between a high- and a low-pressure shaft.

12. The arrangement according to claim 1, wherein a size of the air inlet holes is variable for setting a pressure in the high-pressure chamber and for setting a load on the high-pressure turbine.

13. The arrangement according to claim 1, wherein the low-pressure chamber is generally located in a vicinity of a drive cone of the high-pressure shaft.

14. The arrangement according to claim 1, wherein the high-pressure chamber is generally located in a vicinity of a turbine disc.

15. The arrangement according to claim 1, wherein the seals are labyrinth packings.

16. The arrangement according to claim 1, wherein the seals are carbon packings.

17. The arrangement according to claim 1, wherein the low-pressure chamber is connected to a bypass flow duct of a fan engine.

18. The arrangement according to claim 1, wherein the low-pressure chamber is connected to a chamber between a high- and a low-pressure shaft.

\* \* \* \* \*